United States Patent [19] [11] 3,708,179
Hulten [45] Jan. 2, 1973

[54] DOOR ASSEMBLY
[75] Inventor: Richard E. Hulten, Durham, N.H.
[73] Assignee: McCord Corporation, Detroit, Mich.
[22] Filed: Aug. 7, 1970
[21] Appl. No.: 61,930

[52] U.S. Cl..............................280/150 AB, 220/59
[51] Int. Cl...............................................B60r 21/00
[58] Field of Search.......280/150 AB, 150 B; 180/90; 220/29, 60, 59; 229/47

[56] References Cited

UNITED STATES PATENTS

| | | | |
|---|---|---|---|
| 1,115,507 | 11/1914 | Chellis | 220/59 |
| 3,080,087 | 3/1963 | Cloyd | 220/60 X |
| 1,437,083 | 11/1922 | Arnold | 292/DIG. 21 |
| 3,539,200 | 11/1970 | Chute | 280/150 AB |
| 1,115,163 | 10/1914 | Bloomer | 229/47 |
| 1,217,668 | 2/1917 | Trumblower | 229/47 X |
| 3,514,124 | 5/1970 | Richardson | 280/150 AB |

FOREIGN PATENTS OR APPLICATIONS 896,312  11/1953  Germany.........................280/150 AB Primary Examiner—Kenneth H. Betts
Attorney—McGlynn, Reising, Milton & Ethington

[57] ABSTRACT

A door assembly for an opening through which an inflatable safety device expands. The assembly includes a frame surrounding the opening, and at least one door element pivotally mounted on the frame. The door element is held in the closed position by a plurality of ears which extend laterally between the door element and the frame, and which are adapted to distort when an opening force is exerted against the door element by the inflatable safety device when the latter is expanded.

6 Claims, 7 Drawing Figures

PATENTED JAN 2 1973 3,708,179

INVENTOR
RICHARD E. HULTEN
BY
Chittick, Pfund, Birch, Samuels & Gauthier
ATTORNEYS PATENTED JAN 2 1973
3,708,179
SHEET 2 OF 3
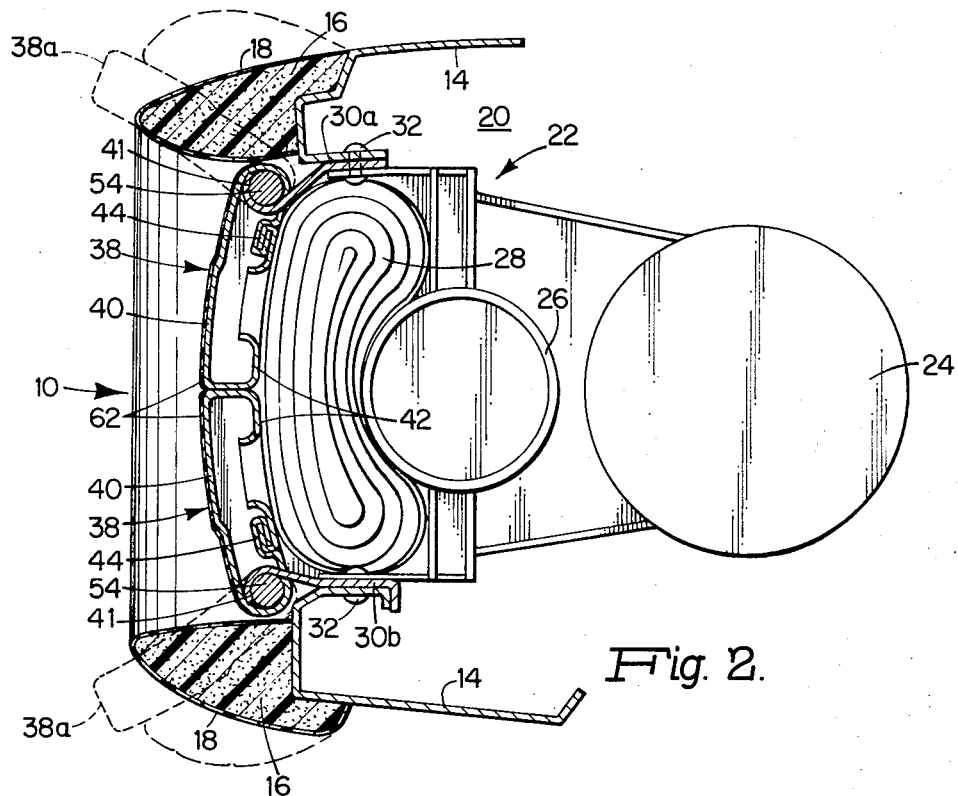
Fig. 2.
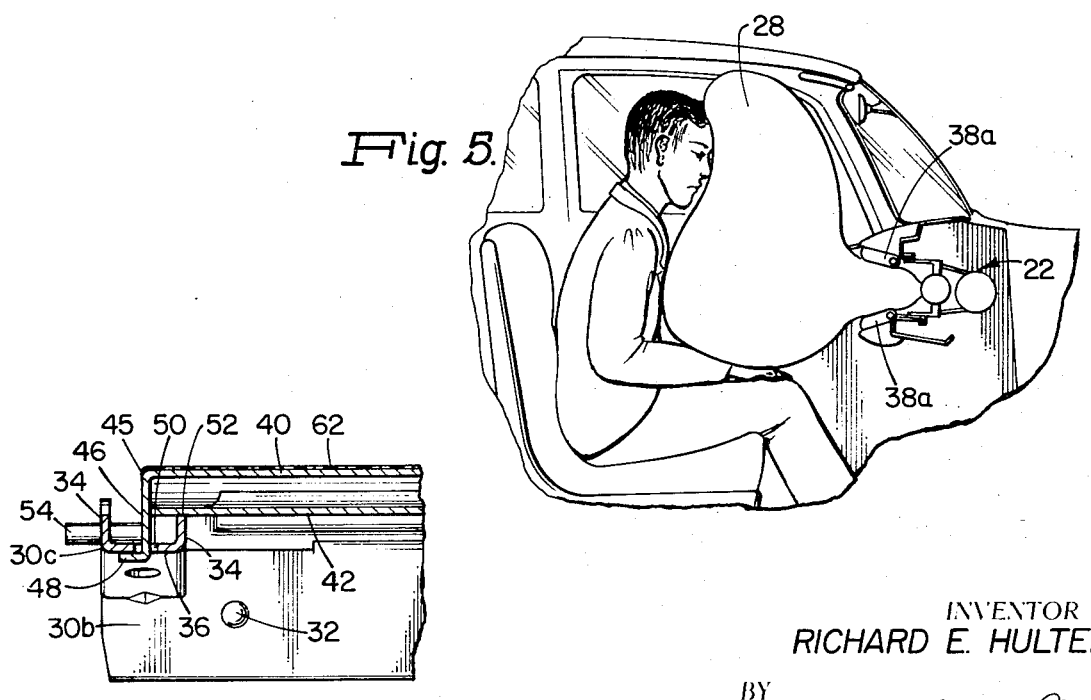
Fig. 5.
Fig. 4.
INVENTOR
RICHARD E. HULTEN
BY
Chittick, Pfund, Birch, Samuels & Gauthier
ATTORNEYS

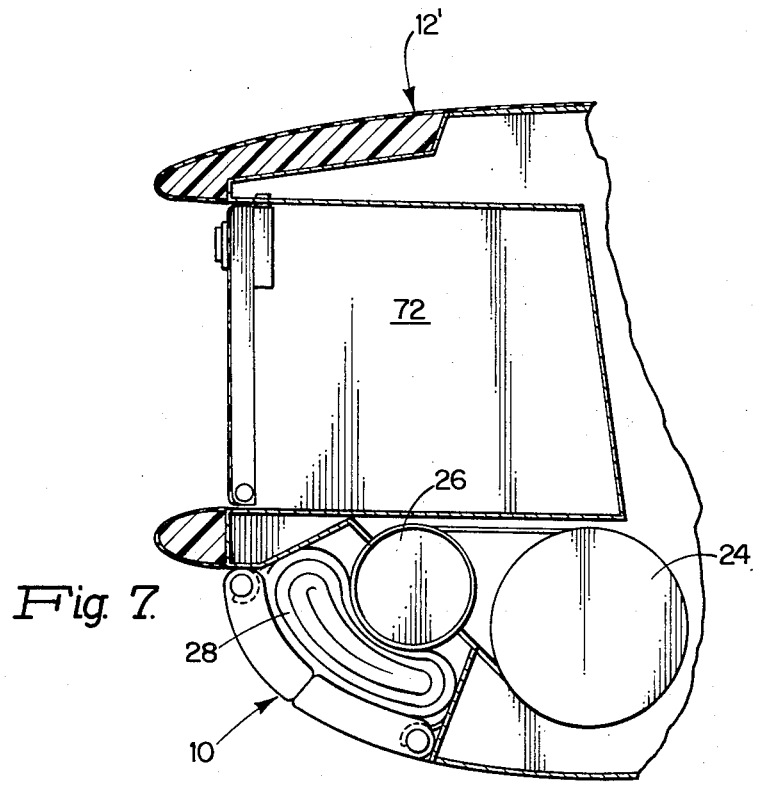
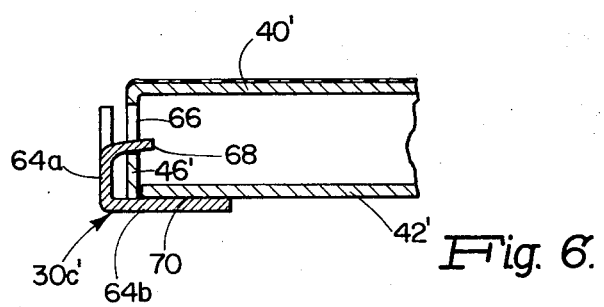

DOOR ASSEMBLY

DESCRIPTION OF THE INVENTION

This invention relates generally to inflatable safety devices of the type employed to protect vehicle passengers in the event of a collision, and more particularly to a novel door assembly which serves as a closure for the opening through which an inflatable safety device expands from an appropriately positioned cavity into the passenger compartment of a transport vehicle, for example an automobile, aircraft, etc.

An object of the present invention is to provide a door assembly having improved retainer means for holding the door element or elements in a closed position, which retainer means is adapted to distort under an opening force exerted by the expanding inflatable safety device. Still another and closely related object of the present invention is to provide retainer means which yield to an opening force of substantially constant magnitude, regardless of the temperature prevailing at the time that the inflatable safety device is actuated. Another object of the present invention is to provide a door assembly which is attractive in appearance and which is durable and capable of resisting normal wear and tear. A further object of the present invention is to provide a door assembly embodying a relatively lightweight construction which is crushable and offers good energy-absorbing characteristics when contacted by vehicle passengers during secondary and/or low speed impacts. A still further object of the present invention is to provide a door assembly which is economical to fabricate and which is adaptable for use in a variety of locations.

These and other objects of the present invention will become more apparent as the description proceeds with the aid of the accompanying drawings wherein:

FIG. 2 is a sectional view taken along line 2—2 of FIG. 1;

FIG. 4 is a sectional view taken along lines 4—4 of FIG. 3 showing details of one embodiment of the retainer means employed to hold the door elements in the closed position;

FIG. 5 is a somewhat schematic illustration depicting the door assembly in the open position following actuation of the inflatable safety device;

FIG. 6 is a sectional view similar to FIG. 4 showing an alternate embodiment of the retainer means; and, FIG. 7 is a sectional view showing a door assembly according to the present invention positioned at a different location in an automobile crash pad.

Figure 1:
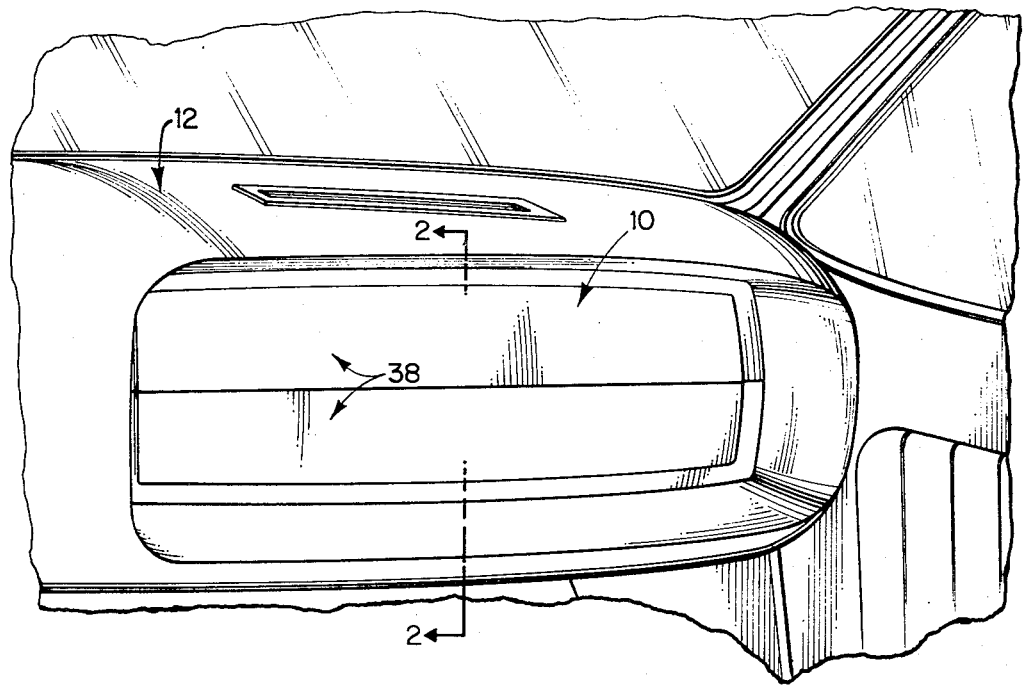
FIG. 1 is a perspective view of one embodiment of a door assembly embodying the concepts of the present invention.
Figure 3:
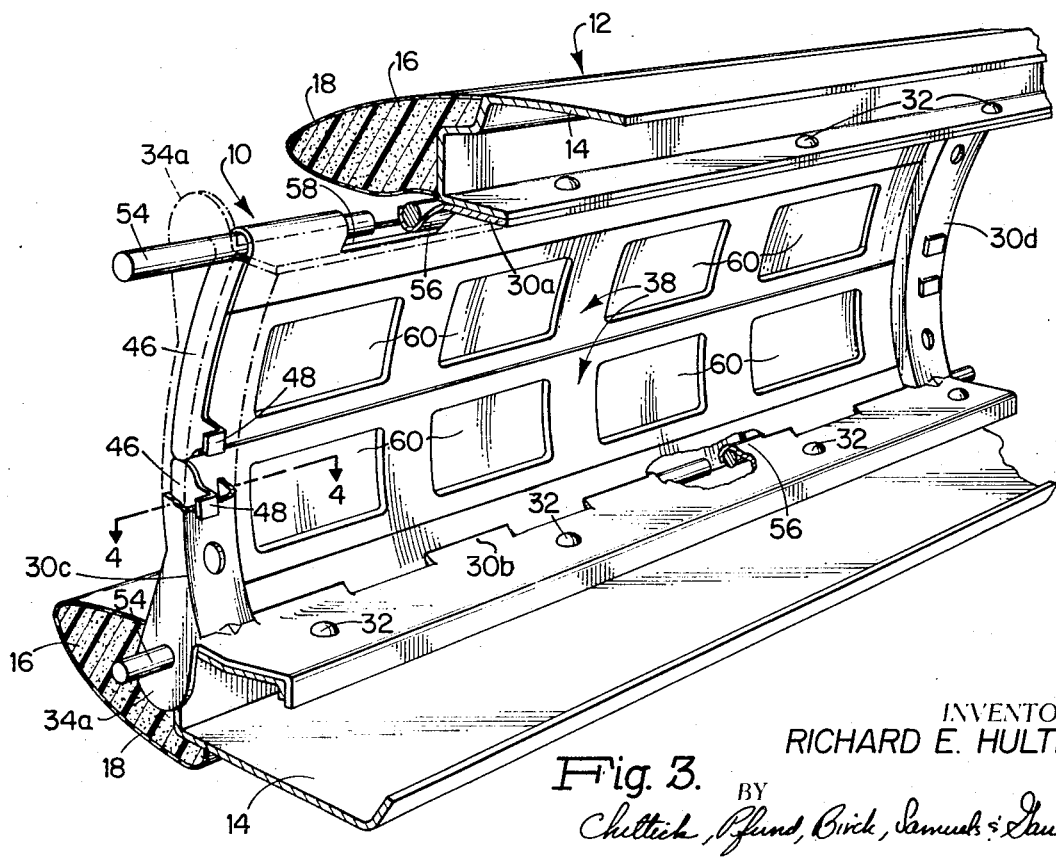
FIG. 3 is a rear perspective view of the door assembly shown in FIGS. 1 and 2 with portions of the assembly broken away to better illustrate structural details.

Referring initially to FIGS. 1–5 of the drawings, there is generally indicated at 10 a door assembly according to the present invention, which may at times hereinafter be referred to as a "closure means," mounted in a crash pad 12 of the type typically found in an automobile. The crash pad includes a metal base member 14 which serves to attach the crash pad to the body frame of the automobile and which supports a cushioning layer 16 of any suitable composition, for example, urethane foam, the latter being covered by a plastisol skin 18. The crash pad defines a cavity 20 having an opening facing the passenger side of the front seat of the vehicle. An inflatable safety device generally indicated at 22 is located within cavity 20. The safety device herein illustrated includes a bottle or other like container 24 containing gas under pressure, a manifold-type diffuser 26 connected to the gas bottle, and an expandable bag 28 connected to the diffuser. When in the inoperative condition, the bag 28 is collapsed and folded against the diffuser as shown in FIG. 2. Should the vehicle experience a collision of a predetermined magnitude, the safety device is actuated by known means, thus causing gas to escape from the bottle 24 through the diffuser 26 into the bag 28, with the result that the bag expands out of the cavity 20 into the passenger compartment of the vehicle to cushion the passenger in the manner schematically depicted in FIG. 5.

It will be understood that the structural details of the crash pad 12 and the inflatable safety device 22, as well as the mode of operation of the latter, do not form a part of the present invention and are described herein solely for the purpose of providing a basis for a further description of the door assembly 10.

The door assembly 10 includes a frame made up of side members 30a and 30b and end members 30c and 30d. For convenience or reference the frame side and end members will at times hereinafter be referred to collectively as "frame 30." The side members 30a and 30b are attached to the metal base member 14 of the crash pad by any convenient means, such as for example by rivets 32. The end members 30c and 30d of the frame are each provided with generally U-shaped cross-sections which face outwardly towards the passenger compartment. As is best shown in FIG. 4, each of the frame end members includes a pair of spaced parallel legs 34 joined at the rear by a web section 36. Preferably, frame 30 is generally rectangular in shape and surrounds a correspondingly shaped opening in the crash pad leading from the interior cavity 20 to the passenger compartment.

Frame 30 pivotally supports a pair of door elements generally indicated at 38. Each door element preferably is made up of a light gauge metal stamping which includes a front surface 40 having its longer dimensioned sides bent around and back as at 41 (See FIG. 2) to form a back surface 42 with the side edges of the stamping being interconnected as by folding and crimping at 44. The ends 46 of each front surface 40 are also bent around and back as at 45 (See FIG. 4) to close the ends 46 of the door elements. In the embodiment shown in FIGS. 1–5, the end sections 46 are further provided with integral ears 48 which as perhaps can best be seen in FIG. 4, extend through slots 50 in the webs 36 of the frame end sections 30c and 30d. Once inserted in the slots 50, the ears are bent over to retain the door elements 38 in the closed positions. When so retained, the back surface 42 of each door element bears against the inside legs of the U-shaped frame end sections as at 52.

Each door element 38 is pivotally attached to frame 30 by means of a rod 54 which extends through the door end sections 46 as well as a flared out section 34a of the legs 34 on the frame end sections 30c and 30d. Further support for each rod 54 is provided by curved extensions 56 of the frame side members 30a and 30b which reach into relieved areas 58 on each of the door elements.

The back surface 42 of each door element is preferably provided with a plurality of cutouts indicated typically at 60 for the purpose of weight reduction. Furthermore, where appropriate, the front surface 40 of each door element will be covered with a relatively thin plastisol sheet 62 which may if desired be identical to the plastisol skin 18 on the crash pad 12.

In use, the door assembly 10 shown in FIGS. 1–5 offers the following advantages: when in the closed position, the door elements 38 provide a neat and attractive closure for the opening in the crash pad 12 leading from cavity 20 to the passenger compartment of the vehicle. By virtue of their relatively lightweight construction, the door elements are crushable and thus capable of absorbing energy and offering a cushioning effect in the event that they are contacted by a passenger as a result of the vehicle undergoing a low speed impact which is not sufficiently violent to actuate the inflatable safety device. However, although crushable, the door elements are inherently rugged and strong enough to withstand the wear and tear to which automotive components are normally exposed.

The door elements are each retained in the closed position by the interlocked engagement of the ears 48 with the frame end members 30c and 30d. The nature of this interlocked engagement is such that the rear surfaces 42 of the door elements are held against the frame end sections as at 52, and this in turn effectively precludes subsequent loosening and rattling. In addition, by mechanically interlocking the door elements 38 with the frame 30, protection is afforded against damage to the inflatable safety device which might otherwise be occasioned by children attempting to gain access into the cavity 20.

When the inflatable safety device 22 is actuated, the bag 28 expands outwardly towards the passenger compartment at an extremely rapid rate. By way of example, recent experimental tests indicate that an inflatable bag can expand from an inoperative fully collapsed folded position to a deployed operative position within a range of 5 to 10 milliseconds. As the bag expands, it contacts the rear surfaces 42 of the door elements 38 and exerts an opening force which deforms the retaining ears 48, thereby immediately freeing the door elements for pivotal movement about the axes defined by rods 54. Once freed, the door elements are rapidly opened to the positions shown in dotted at 38a in FIG. 2 and in solid by the same reference numeral in FIG. 5. The degree to which the door elements will pivot outwardly will of course vary, depending on the design of the crash pad or other cavity-defining structure, but with an installation of the type depicted in FIGS. 1–5, it is expected that the door elements will pivot through an angle of approximately 120° when going from the closed to the open positions. Accordingly, some minor deflection of the crash pad cushioning layers 16 may be experienced.

It will be understood that inflatable safety devices of the type herein referred to are required by industrial and/or governmental standards to operate reliably within a given temperature range, for example between -30° F. to 180° F. Reliable operation is to a considerable extent dependent upon the ability of the door elements 38 to open in response to a force of a relatively constant magnitude within such an established temperature range. Since most metals, and in particular those suited for light gauge stamping operations of the type herein contemplated in the manufacture of the door assembly components, deform in response to a force of a relatively constant magnitude within such a temperature range, the present invention is ideally suited to meet the aforesaid reliability requirement. This is to be contrasted to some of the alternate schemes which have been considered in the past where for example the opening through which the inflatable safety device is deployed is covered with a thin plastisol skin. Such arrangements lack reliability because the force required to break through the plastisol skin may be considerably greater when the skin is warm and pliable. Also, at lower temperatures, the skin may become brittle and thus have a tendency to shatter into small sharp projectiles which could injure passengers when the inflatable bag is deployed. The present invention avoids all of these drawbacks by providing retaining means which distort in response to an opening force of a relatively constant magnitude, and which at all times remain integrally connected to the door assembly.

The inherent crushability of the door elements 38 and frame 30 is also an important consideration after the bag 28 has been deployed. More particularly, current designed for inflatable safety devices of the type herein referred to for the most part contemplate rapid deflation of the bag immediately following deployment. Accordingly, should the vehicle thereafter experience a second impact causing the passengers to be thrown towards the crash pad, the open doors will readily yield through deformation to provide a further energy absorbing cushioning effect.

In light of the foregoing, it will now be apparent that modifications may be made to the embodiment disclosed in FIGS. 1–5 without departing from the spirit and scope of the invention. By way of example, and with particular reference to FIG. 6, there is shown an alternate arrangement for holding the door elements in the closed position, wherein the frame end member 30c' is provided with an L-shaped cross-section made up of perpendicular flanges 64a and 64b. The door element is again provided with front and rear surfaces 40' and 42', and an end section 46' which is slotted as at 66. The flange 64a has an ear 68 integral therewith which is adapted to be bent over into the slot 66, thereby retaining the door element in the closed position with the rear surface 42' of the door element bearing against the other flange 64b as at 70. This arrangement differs from that shown in FIGS. 1–5 in that the retaining ear is integral with the frame rather than with the door elements. Otherwise, the arrangement shown in FIG. 6 operates in basically the same manner as that shown in FIGS. 1–5, and thus offers the same advantages.

While the embodiments herein illustrated employ two door elements, it will be understood that under certain circumstances, only one may be required, as for example where the inflatable safety device is of a smaller size, requiring a correspondingly smaller opening through which the air bag is to be deployed.

It will also be understood that the present invention is readily adaptable for use in different locations wherever inflatable safety devices may be installed. Again, by way of example, and with specific reference to FIG. 7, it will be seen that a door assembly 10 according to the present invention may be employed in a crash pad 12' beneath a glove compartment 72. This type of arrangement may be useful when it is desired to initially direct the expanding bag in a downwardly inclined direction towards the legs of a passenger. Once the bag contacts the passenger's legs, it then expands upwardly to cushion the body and head. The invention may also be located in areas other than vehicle crash pads. Examples of alternate locations include the back side of a vehicle front seat, when the inflatable safety device is to function as a cushioning element for passengers in the rear seat, and in the top section of either seat, when the inflatable safety device is intended to serve as a head restraint.

It is my intention to cover all changes and modifications of the embodiments herein disclosed which do not constitute departures from the spirit and scope of the invention as claimed.

I claim:

1. A door assembly for an opening through which an inflatable safety device expands comprising: a frame surrounding said opening; at least one door pivotally mounted on said frame for movement between a closed position closing said opening and an open position allowing said inflatable device to expand through said opening; and retaining means for holding said door in the closed position, said retaining means comprising ears and slots with said ears extending into said slots for mechanically interlocking and extending between said frame and said door and being permanently distortable when an opening force is exerted against said door by expansion of said inflatable safety device.

2. The apparatus as claimed in claim 1 wherein said door means is comprised of a pair of door elements mounted on said frame for pivotal movement about parallel axes located adjacent to opposite edges of said opening.

3. The apparatus as claimed in claim 2 wherein said door elements, when in the closed position, abut each other along edges opposite to the door edges which are adjacent said axes.

4. The apparatus as claimed in claim 1 wherein said door is metallic and wherein said ears are integral with said door and extend laterally from the edges of said door into mechanical interlocking engagement with said frames.

5. The apparatus as claimed in claim 1 wherein said door means is comprised of at least one metallic door element, and wherein said retaining means is comprised of ears integral with said frame, which ears extend laterally from said frame into mechanical interlocking engagement with said door elements.

6. For use with an inflatable safety device of the type which is normally contained in a deflated condition within a cavity adjacent to the passenger compartment of a vehicle and which is inflated and allowed to expand through an opening into the passenger compartment when one vehicle experiences a violent collision, closure means for said opening comprising in combination: a frame surrounding said opening; door means pivotally mounted on said frame for movement from a closed position closing said opening to an open position allowing said inflatable device to expand into the passenger compartment through said opening, said door means including a plurality of door elements, each of which is mounted on said frame for pivotal movement about an axis adjacent to one edge of said opening; and, retainer means for holding said door elements in the closed position, said retainer means including integral laterally extending ears on said door elements, the said ears being in mechanical interlocked engagement with slots in said frame and being permanently distortable out of interlocked engagement with said frame when an opening force is exerted against said door elements by expansion of said inflatable safety device.

* * * * *